(12) United States Patent
Kneckt et al.

(10) Patent No.: US 8,773,995 B2
(45) Date of Patent: Jul. 8, 2014

(54) SYSTEM AND METHOD FOR TRANSMISSIONS IN POWER SAVE MODE

(75) Inventors: Jarkko Kneckt, Espoo (FI); Carl Wijting, Helsinki (FI)

(73) Assignee: Nokia Corporation, Espoo (FI)

( * ) Notice: Subject to any disclaimer, the term of this patent is extended or adjusted under 35 U.S.C. 154(b) by 1016 days.

(21) Appl. No.: 12/247,941

(22) Filed: Oct. 8, 2008

(65) Prior Publication Data

US 2009/0097438 A1 Apr. 16, 2009

Related U.S. Application Data

(60) Provisional application No. 60/979,008, filed on Oct. 10, 2007.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl.
USPC ......................................................... 370/235

(58) Field of Classification Search
USPC .......................................................... 370/235
See application file for complete search history.

(56) References Cited

U.S. PATENT DOCUMENTS

| | | | | |
|---|---|---|---|---|
| 7,656,831 | B2* | 2/2010 | Gao et al. ........................ | 370/311 |
| 2005/0018624 | A1* | 1/2005 | Meier et al. ..................... | 370/318 |
| 2005/0135284 | A1* | 6/2005 | Nanda et al. .................... | 370/294 |
| 2005/0136833 | A1* | 6/2005 | Emeott et al. .................. | 455/11.1 |
| 2005/0152324 | A1  | 7/2005 | Benveniste |  |
| 2006/0285527 | A1  | 12/2006 | Gao et al. |  |
| 2007/0161364 | A1  | 7/2007 | Surineni et al. |  |
| 2008/0247377 | A1* | 10/2008 | Van Horn et al. .............. | 370/348 |
| 2010/0080312 | A1* | 4/2010 | Moffatt et al. ................. | 375/260 |

* cited by examiner

*Primary Examiner* — Jason Mattis
*Assistant Examiner* — Adnan Baig
(74) *Attorney, Agent, or Firm* — Harrington & Smith

(57) ABSTRACT

System and method for power saving transmission in a wireless communications networks. In one embodiment, a communications device includes a transceiver configured to transmit or receive frames over a peer communications link to or from another communications device in a wireless communications network. The communications device also includes a controller configured to initiate a service period for transmission of data frames to the another communications device. The controller is also configured to terminate the service period following an acknowledgement to a transmission of a last data frame therein addressed to either the communications device or the another communications device.

18 Claims, 11 Drawing Sheets

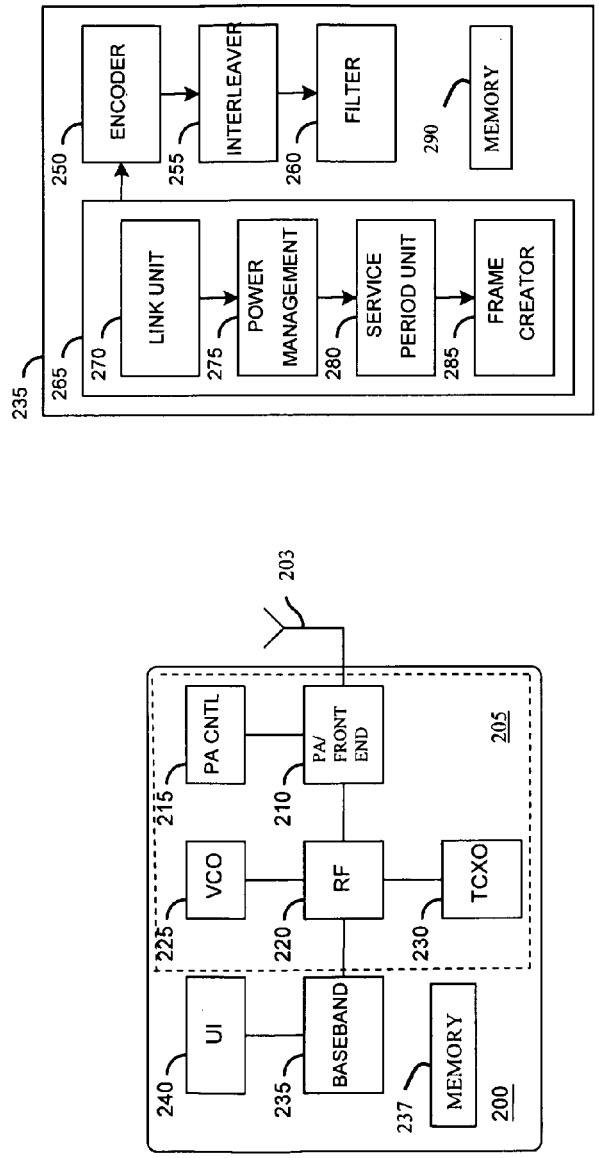

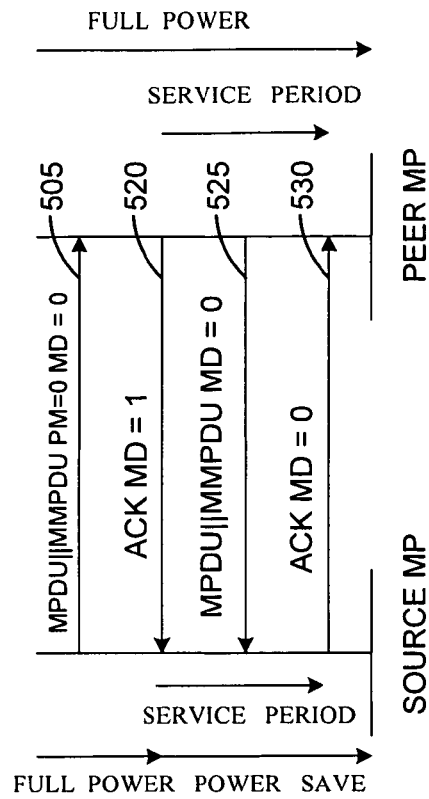
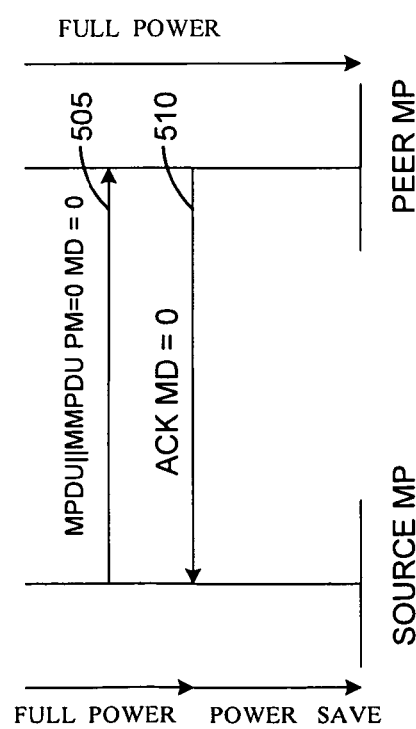
Fig. 5b
Fig. 5a

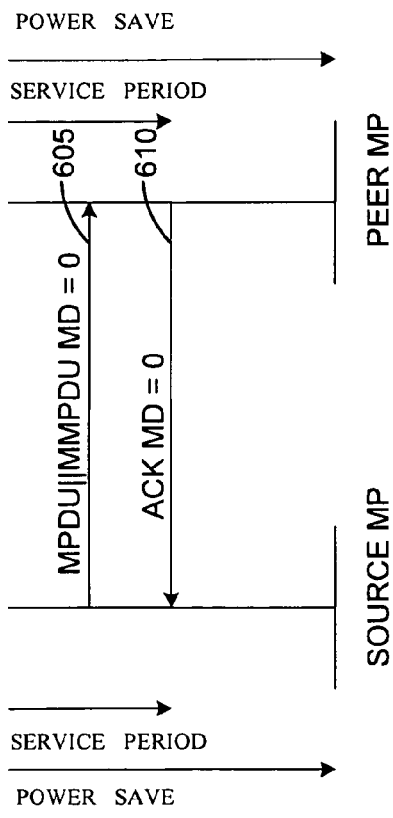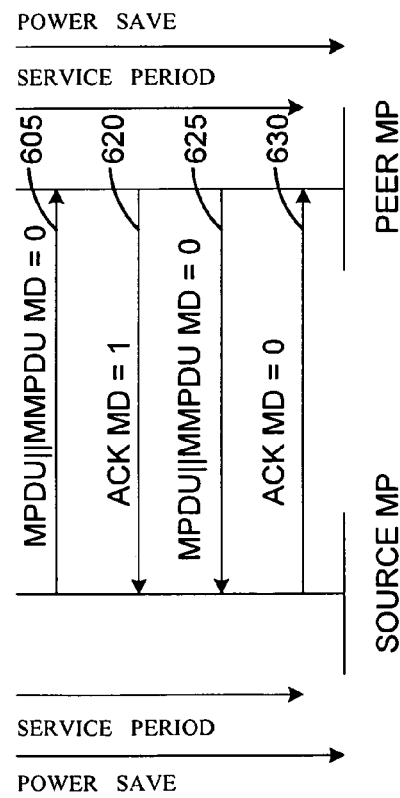

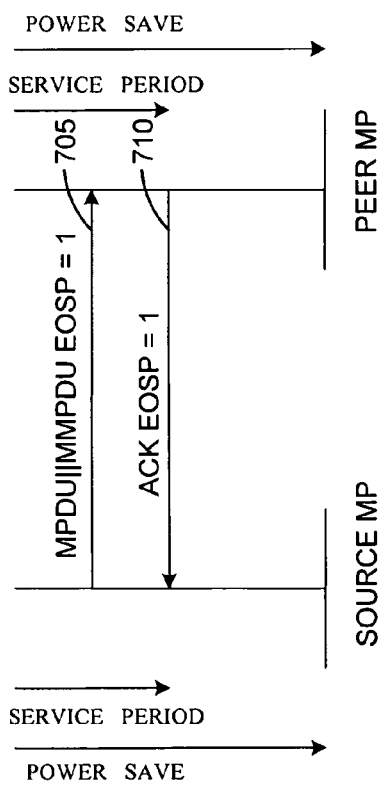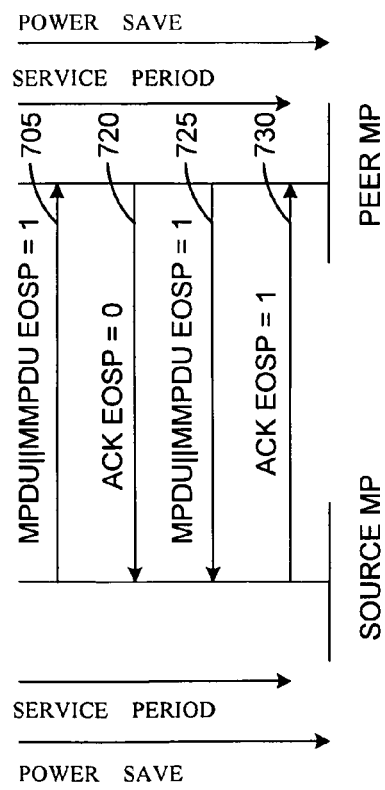

SYSTEM AND METHOD FOR TRANSMISSIONS IN POWER SAVE MODE

This application claims the benefit of U.S. Provisional Application No. 60/979,008 entitled "System and Method for Power Saving Transmission in Ad Hoc Wireless Communications Networks," filed on Oct. 10, 2007, which is incorporated herein by reference.

TECHNICAL FIELD

The present invention relates to communication systems and, more particularly, to a system and method for power saving transmission in wireless communications networks.

BACKGROUND

An ad hoc wireless communications network may be a communications network that communicates wirelessly without the assistance of a wired infrastructure. Furthermore, communication nodes in an ad hoc wireless communications network may communicate directly without needing to communicate through an intermediary wireless communication node. An ad hoc wireless communications system may be thought of as a distributed system. The elimination of the need for a wired infrastructure and intermediaries may enable rapid and inexpensive deployments of ad hoc wireless communications networks. For example, ad hoc wireless communications networks compliant with the Institute of Electronic and Electrical Engineers ("IEEE") technical standards entitled "Information technology—Telecommunications and information exchange between systems—Local and metropolitan area networks—Specific requirements—Part 11: Wireless LAN Medium Access Control ("MAC") and Physical Layer ("PHY") Specifications" (referred to as IEEE standard 802.11, which is incorporated herein by reference) may be brought rapidly into service without requiring a large investment in infrastructure.

A large number of communication devices operating in an ad hoc wireless communications network may be mobile in nature, meaning that the communication devices may be powered by a battery. Therefore, power consumption may be an item of importance. A communication device with high power consumption may have an abbreviated operating period before requiring that the battery be recharged or replaced. Otherwise, the communication device may require a large battery that may reduce the mobility and practicality of the communication device itself. In addition to implementing power saving features in the communication device, such as low power electronics, shutting down inactive portions of the communication device, improving communication device efficiency, and so forth, it would be beneficial to implement power saving techniques in the data transmissions of the ad hoc wireless communications network itself.

Accordingly, what is needed in the art is a system and method for power saving transmission in wireless communications networks.

SUMMARY OF THE INVENTION

These and other problems are generally solved or circumvented, and technical advantages are generally achieved, by embodiments of the present invention, which include a system and method for power saving transmission in wireless communications networks. In one embodiment, a communications device includes a transceiver configured to transmit or receive frames over a peer communications link to or from another communications device in wireless communications network. The communications device also includes a controller configured to initiate a service period for transmission of data frames to the another communications device. The controller is also configured to terminate the service period following an acknowledgement to a transmission of a last data frame therein addressed to either the communications device or the another communications device.

The foregoing has outlined rather broadly features as described herein such that the detailed description of some of the embodiments that follow may be better understood. Additional features of the embodiments will be described hereinafter, which form the subject of the claims as set forth below. It should be appreciated by those skilled in the art that the conception and specific embodiments disclosed may be readily utilized as a basis for modifying or designing other structures or processes for carrying out the same purposes as described herein. It should also be realized by those skilled in the art that such equivalent constructions do not depart from the spirit and scope as set forth in the appended claims.

BRIEF DESCRIPTION OF THE DRAWINGS

For a more complete understanding of the invention, and the advantages thereof, reference is now made to the following descriptions taken in conjunction with the accompanying drawing, in which:

FIG. 1 illustrates a diagram of exemplary power save states for a mesh point in an IEEE standard 802.11 compliant ad hoc wireless communications network in accordance with the principles of the present invention;

FIGS. 2a and 2b illustrate diagrams of an embodiment of a wireless communications device for use in a wireless communications network in accordance with the principles of the present invention;

FIG. 5a illustrates a transmission diagram displaying exemplary transmissions between a source mesh point and a peer mesh point wherein the source mesh point desires to change power management states in accordance with the principles of the present invention;

FIG. 5b illustrates a transmission diagram displaying exemplary transmissions between a source mesh point and a peer mesh point wherein the source mesh point desires to change power management states in accordance with the principles of the present invention;

FIG. 6a illustrates a transmission diagram displaying exemplary transmissions between a source mesh point and a peer mesh point to end a service period in accordance with the principles of the present invention;

FIGS. 6b and 6c illustrate transmission diagrams displaying exemplary transmissions between a source mesh point and a peer mesh point to end a service period in accordance with the principles of the present invention;

FIG. 7a illustrates a transmission diagram displaying exemplary transmissions between a source mesh point and a peer mesh point to end a service period using end of service ("EOSP") bits in accordance with the principles of the present invention;

FIG. 7b illustrates a transmission diagram displaying exemplary transmissions between a source mesh point and a peer mesh point to end a service period using EOSP bits in accordance with the principles of the present invention.

DETAILED DESCRIPTION OF ILLUSTRATIVE EMBODIMENTS

Figure 2C:
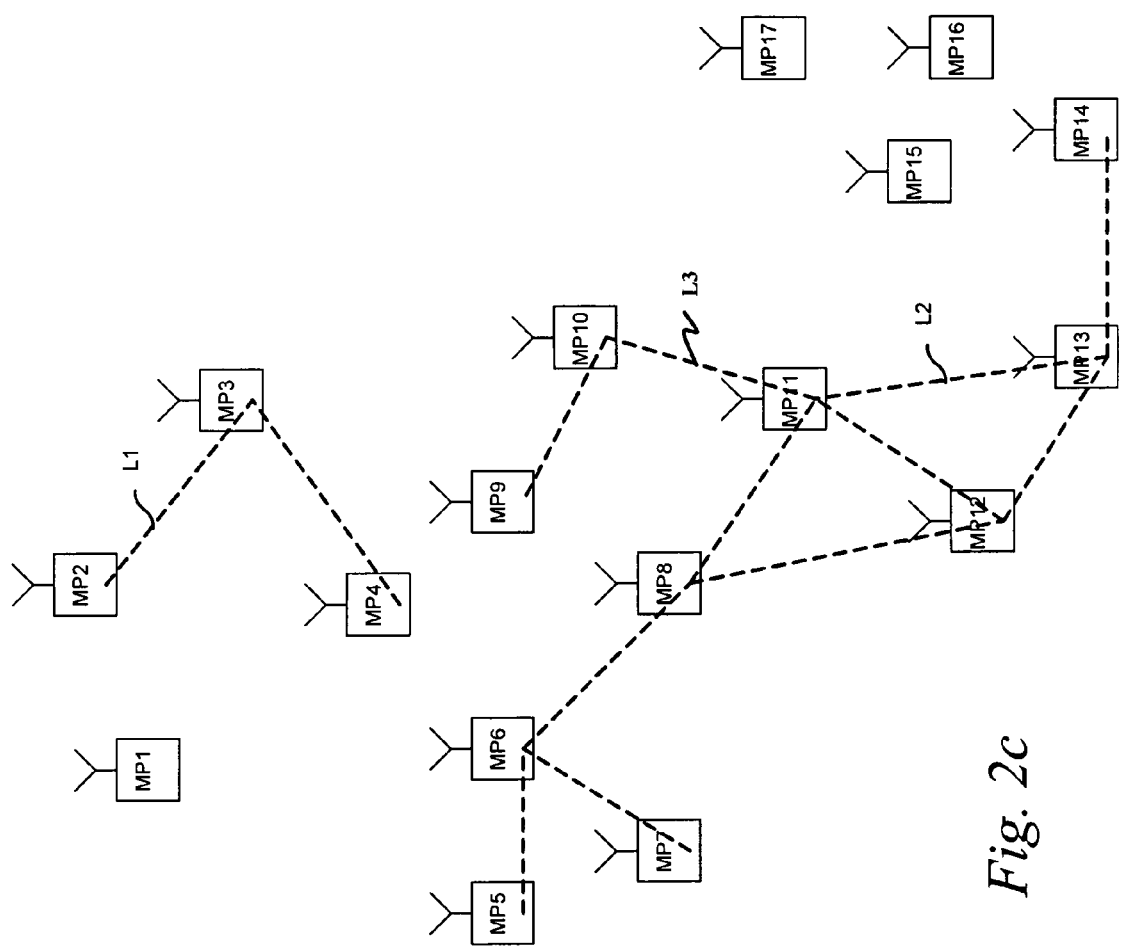
FIGS. 2c and 2d illustrate diagrams of exemplary wireless communications networks in accordance with the principles of the present invention.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments of the system and method will be described in a specific context, namely, an IEEE standard 802.11 specifically IEEE standard 802.11s) compliant ad hoc wireless communications network. The system and method may also be applied, however, to other ad hoc wireless communications networks, such as IEEE standard 802.16 compliant ad hoc wireless communications networks, and so forth.

Referring initially to FIG. 1, illustrated is a diagram of exemplary power save states for a mesh point in an IEEE standard 802.11 compliant ad hoc wireless communications network in accordance with the principles of the present invention. According to the IEEE standard 802.11s technical standards, a mesh point (also referred to as "MP" or "MPS") may or may not be a power save supporting mesh point. A power save supporting mesh point that is operating in power save mode or intends to operate in power save mode may establish communications links with other power save supporting mesh points. Power save supporting mesh points may advertise their capabilities by setting a power save support enabled bit in beacon and probe response frames transmitted by the mesh points. A power management bit or control bit indicates the operating mode of the power save supporting mesh points.

When a mesh point's power save support enabled bit is set to zero (0), then the mesh point is not a power save supporting mesh point and the power management bit is set to zero (0) in all transmitted frames. When the mesh point is not a power save supporting mesh point, then frames (e.g., data frames) received by the mesh point may be transmitted as soon as possible with little or no buffering of the data frames (e.g., other than buffering to wait until an available transmission opportunity). Furthermore, communications links ending at or originating from the mesh point are operating at full power, meaning that peer mesh points (e.g., mesh points connected to the mesh point) should also be operating as non-power save supporting mesh point or a power save supporting mesh point operating at full power.

However, if a mesh point's power save support enabled bit is set to one (1), then the state of the power management bit may indicate the operating mode of the mesh point. If the power management bit is set to zero (0), then the mesh point is in an active operating mode (denoted power save supported-active mode). Power save supported-active mode may also often be referred to as being full power mode. However, there may be differences between a true full power mode (e.g., with the power save support enabled bit set to zero (0)) and a power save supported-active mode. When the mesh point is in a power save supported-active mode, then unicast data frames may be transmitted as soon as possible, while multicast and broadcast data frames may be buffered and transmitted after a delivery traffic indication message ("DTIM") beacon has been detected. However, if the power management bit is set to one (1), then the mesh point is in a doze mode (denoted power save supported-doze mode). When the mesh point is in power save supported-doze mode, the mesh point may alternate between power save supported-active mode and power save supported-doze mode. When in power save supported-doze mode, unicast data frames may be buffered, depending on the state of the unicast data frame's recipient's power save mode. Furthermore, multicast and broadcast data frames may be buffered and transmitted after a detection of a DTIM beacon, and the mesh point may make use of service periods to exchange data frames with other mesh points. While the mesh point is in a service period, the mesh point is in a power save supported-active mode.

A mesh point may have multiple communications links connected to other mesh points in the ad hoc wireless communications network. Although the mesh point may operate in a single power save mode (e.g., power save supported-active mode or power save supported-doze mode) at a given time, each communications link may operate in an independent power save mode. For example, over a first communications link, the mesh point may operate as a power save supported-active mesh point, while over a second communications link; the mesh point may operate as a power save supported-doze mesh point. However, if the mesh point is operating in a power save supported-active mode for any of its communications links, then the mesh point may need to operate in the power save supported-active mode (e.g., have its receiver on). A mesh point with an intent to change its power saving mode may do so by transmitting an appropriately marked transmission (e.g., a unicast transmission with a power management bit set to a desired or specified value). If a mesh point operates in power save-supported doze mode for one or more than one communications link with power management bit set to one (1), then multicast and broadcast frames originating from the mesh point may have the power management bit set to one (1).

A mesh point operating in a power save supported-doze mode may initiate a service period with another mesh point over a communications link to exchange data frames. The service period may be used to create a temporary availability for the mesh point to exchange data and to simplify a transition to stop listening to a communications media by turning the mesh point's receiver off. Without service periods, a mesh point may not be able to receive data frames while operating in power save supported-doze mode.

A mesh point may have its radio receiver in an on state, if it has indicated over any communications link that it is operating in power save supported-active mode or if it has one or more on going service periods. In general, there may be four different power save mechanisms for data transmission in an ad hoc wireless communications network, namely, a full power transmission mode, power save transmission mode using an announcement traffic indication message ("ATIM") period after beacon or power save ("PS")-poll and ATIM frame exchange, a periodic automatic power save delivery ("APSD") transmission mode, and an aperiodic APSD transmission mode.

In a full power transmission mode, mesh points associated with the transmission may be operating in a power save supported-active mode for the communications link and may remain in this operation mode until data frames are transmitted or for a period of time after an exchange of a last data frame exchange if it seems unlikely that additional data frames are to be exchanged. The mesh points may receive and transmit data frames when transmission opportunities arise, without need to wait for PS-poll, ATIM, trigger frames, and so forth, to set up a service period. The use of the power save supported-active mode may be terminated by transitioning to a power save supported-doze mode. This power save mechanism may be good for situations wherein there are large amounts of data to transmit, for example.

In a power save transmission mode using ATIM period after a beacon or PS-poll and ATIM exchange, one or both mesh points associated with the transmission may be operating in a power save supported-doze mode and a transmission in an ATIM period after a beacon or a PS-poll and an ATIM exchange may be used to set up a service period. During the service period, data transmissions may be performed. After a termination of the service period, the mesh points may need to initiate a new service period or both mesh points may need to use power save supported-active mode to directly transmit additional data frames to each other.

In a periodic APSD transmission mode, mesh points may signal a periodically repeating time period that may initiate a service period to transmit data. If the service period is not terminated before a start time of a new service period, the service period may be continued. This power save mechanism may be well suited for real-time and gaming applications, for instance.

In an aperiodic APSD transmission mode, a first mesh point may be operating in a power save supported-active mode and a second mesh point may be operating in a power save supported-doze mode. The second mesh point (e.g., the mesh point operating in the power save supported-doze mode) may initiate a service period by transmitting a trigger frame to the first mesh point (e.g., the mesh point operating in the power save supported-active mode). The trigger frame initiates a service period, which may be used to transmit data frames between the mesh points.

Turning now to FIGS. 2a and 2b, illustrated are diagrams of an embodiment of a wireless communications device 200 for use in a wireless communications network (e.g., an ad hoc wireless communications network) in accordance with the principles of the present invention. The wireless communications device 200 includes an antenna 203 for receiving and transmitting signals over-the-air. Although a single antenna is shown in FIG. 2a, multiple antennas may be used by the wireless communications device 200 to improve wireless performance. The discussion that follows provides an exemplary operation of the wireless communications device 200 after receiving a signal and the subsequent processing thereof.

The received signal, transmitted over-the-air and received by the antenna 203, may then be provided to a power amplifier ("PA") and front end unit 210. The PA and front end unit 210 may be used to amplify the received signal so that it may be within a signal level range that may be compatible with a remainder of signal processing components in the wireless communications device 200. A PA control unit 215 may be used to adjust the amplification of the PA and front end 210 so that the received signal receives a proper amount of signal amplification. A radio frequency ("RF") unit 220 may then be used to perform signal processing on the amplified received signal. The RF unit 220 may perform processing operations such as filtering the amplified received signal to eliminate out of band noise and interference, and so forth. Additionally, the RF unit 220 may be used to demodulate the amplified received signal, by removing a carrier frequency and bringing the amplified received signal down to its baseband frequency, thus producing a baseband signal. Voltage controlled oscillators ("VCO") 225 and temperature controlled crystal oscillators ("TCXO") 230 may be used to provide needed frequency references.

Once brought down to its baseband frequency, the baseband signal may be provided to a baseband unit 235. The baseband unit 235 may be used to provide signal processing of the baseband signal and may perform the signal processing in both a digital and an analog domain. The baseband unit 235 may perform analog signal processing operations such as filtering, amplification, and so forth. While the baseband unit 235 may perform digital signal processing operations such as error detection/correction, deinterleaving, filter, amplification, and so forth. Additionally, the baseband unit 235 may also be used to interface with a user interface ("UI") 240 of the wireless communications device 200. The UI 240 may include a keypad, display, memory, microphone, speakers, wired headsets, and so on. Furthermore, the baseband unit 235 may be used to disassemble frames or packets from the digitized baseband signal to extract data from received frames or packets. The wireless communications device may also include memory 237 that stores programs and data of a temporary or more permanent nature.

Similarly, the wireless communications device 200 may be used to transmit frames including data. The data to be transmitted may be processed in the baseband unit 235. The processing may include interleaving, error encoding, filtering, and so forth. Error encoding may involve the application of an error correcting code by an encoder 250 to data to be transmitted to help protect the data from damage caused by noise and interference. An interleaver 255 may reorder the data to be transmitted, which may have already been error encoded to help reduce the probability of consecutive data bits being corrupted. A filter 260 may be used to shape spectral characteristics of the data to be transmitted, which may have also been error encoded and interleaved. For the purposes of the discussion herein, a transceiver 205 that forms a transmitter and receiver for the wireless communications device 200 includes, in part, at least a portion of the PA and front end unit 210, the PA control unit 215, the RF unit 220, and the VCO 225 and TCXO 230. Of course, a transceiver and other wireless communications device functions may be embodied in fewer than or other systems and subsystems as well.

Turning now to FIG. 2b, illustrated is a diagram of an embodiment of a baseband unit 235 employable in the wireless communications device 200 of FIG. 2a in accordance with the principles of the present invention. The baseband unit 235 includes a controller 265, which in addition to controlling the overall operation of the wireless communications device 200, may be used in setting up communications links, performing power saving communications, and setting up and terminating service periods. A link unit 270 in the controller 265 may be used to establish communications links (e.g., peer communication links) between pairs of mesh points, with a link setup unit in a mesh point creating the communications link typically taking control of the communications link process. The link unit 270 may also be used to maintain existing communications links. A power management unit 275 may be used to implement power save transmissions with the power save transmissions being based on the power save mode of the wireless communications device 200. The power management unit 275 may be able to initiate the creation of service periods according to communications link type, application type, and so forth. The power management unit 275 may instruct a service period unit 280 to insert a properly valued more date ("MD") bit or end of service period ("EOSP") bit to start or initiate a service period or terminate a service period in accordance with, for instance, an acknowledgement to a transmission. The service period unit 280 may also be used in creating or responding to a received transmission (e.g., an acknowledgment) that initiates a service period, such as the creation or receipt of a trigger frame, PS-poll plus ATIM frame exchange, an ATIM frame transmission, and so forth.

A frame creator 285 may be used to properly format the frame (e.g., data frame) according to technical specifications of the ad hoc wireless communications network. The data frame may then be converted into analog signals, which may also be processed in the baseband unit 235, which may filter, amplify, and so forth, the analog signals. While many of the examples herein discuss data frames, the principles of the present invention are applicable to any type of frame including, without limitation, control and management frames. The RF unit 220 may be used to apply a carrier frequency to the analog signals for transmission purposes. The RF unit 220 may also apply filters to help ensure that transmissions meet spectral requirements, and so forth. Finally, the PA and front end unit 210 may be used to amplify the analog signals to power levels suitable for transmission via the antenna 203. The baseband unit 235 may also include the encoder 250, the interleaver 255 and the filter 260 as described above, and memory 290 that stores programs and data of a temporary or more permanent nature. The baseband unit 235, or portions thereof, and other subsystems of the wireless communication device 200 may be embodied in a processor of any type suitable to the local application environment, and may include one or more of general purpose computers, special purpose computers, microprocessors, digital signal processors ("DSPs"), and processors based on a multi-core processor architecture, as non-limiting examples.

The memory of the baseband unit 235 and wireless communication device 200 as introduced above may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory may include program instructions that, when executed by an associated processor, enable the baseband unit 235 and wireless communication device 200 to perform tasks as described herein. Exemplary embodiments of the system, subsystems and modules as described herein may be implemented, at least in part, by computer software executable by processors, or by hardware, or by combinations thereof.

Figure 2D:
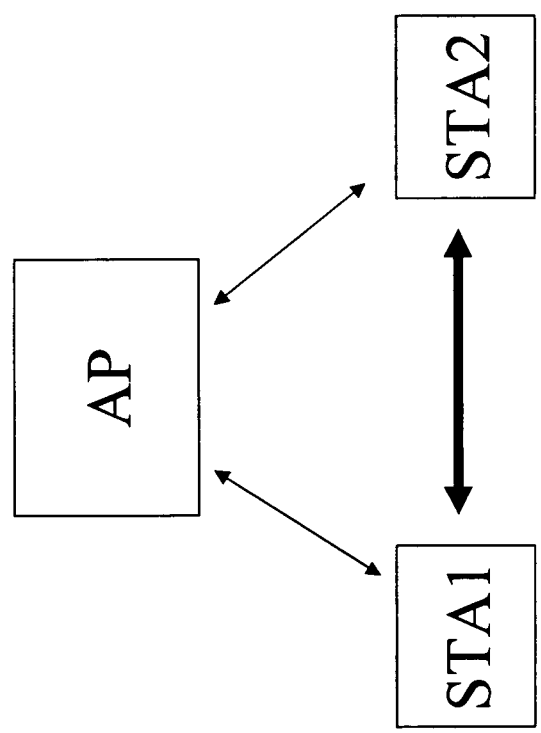

Turning now to FIGS. 2c and 2d, illustrated are diagrams of exemplary wireless communications networks in accordance with the principles of the present invention. Beginning with FIG. 2c, an ad hoc wireless communications network may be adherent to the IEEE standard 802.11s. The ad hoc wireless communications network includes a plurality of mesh points (designated MP1 . . . MP17). Each mesh point may contain a communications device including a transceiver with a transmitter and a receiver analogous to the wireless communications device as described above. A first mesh point may directly communicate wirelessly to a second mesh point without requiring the assistance of a wired infrastructure or a wireless intermediary. For example, the mesh point MP2 may transmit directly to the mesh point MP3 over communications link L1. Similarly, the mesh point MP11 may receive transmissions from the mesh point MP 13 over communications link L2. If some mesh points in the ad hoc wireless communications network use forwarding, routing and communications link metrics, the ad hoc wireless communications network may be capable of transmitting data over multiple hops and organize connectivity over multiple hops in the ad hoc wireless communications network. For instance, with multihop service, mesh point MP13 may transmit data to mesh point MP10, if mesh point MP13 first transmits data over communications link L2 to mesh point MP11 and mesh point MP11 forwards the data to mesh point MP10 over communications link L3. Some times multihop ad hoc wireless communications networks are called mesh networks to highlight the capability of operating over multiple hops. The described power save mechanisms may be used in both single hop ad hoc and multihop mesh networks.

The mesh points in an ad hoc wireless communications network may create peer communications links between pairs of mesh points, in order to share data, security and power save parameters, and so forth. A mesh point may signal its support for APSD and bidirectional service periods in a peer communications link open and confirm messages. In a peer communications link open message, the mesh points may indicate their capabilities, while in a peer communications link confirm message, the mesh points may define the parameters to be used for the communications link. If both mesh points indicate support for a more data acknowledgment ("more data ack"), by setting a 'more data ack' bit to a first specified value (typically one (1)) in the peer communications link confirm message, the peer communications links may utilize bi-directional service periods. If either of the mesh points has set 'more data ack' bit to a second specified value (typically zero (0)), it may be indicating that service periods are uni-directional. A 'more data ack' bit may also indicate a mesh point's capability to set more data bits according to its buffer status to the acknowledgement frame transmitted to its communicating mesh point.

A mesh point may not be limited to use the same 'more data ack' bit values over all of its peer communications links. For some peer communications links, a mesh point may use bi-directional service periods, while for other communications links; the mesh point may use uni-directional service periods. For instance, a mesh point may have implementation specific limitations on a number of peer communications links that are capable of supporting bi-directional service periods. Of course, the mesh points may employ other formats or bits to achieve analogous intentions and still fall within the broad scope of the present invention.

Turning now to FIG. 2d, illustrated is another embodiment of a wireless communications network. The wireless communications network includes an access point (designated AP) associated with first and second wireless stations (designated STA1, STA2, respectively). A direct communications link is illustrated between the first and second wireless stations STA1, STA2, wherein service periods can be established therebetween. In other words, the first and second wireless stations STA1, STA2, are peer wireless stations adherent to IEEE standard 802.11z or any other standard, which employ service periods for communications over a direct peer communications link therebetween. Thus, the principles of the present invention as described herein with respect to the mesh points in accordance with the service periods or otherwise are equally applicable to the peer wireless stations. Additionally, for the purposes of discussion herein, the mesh points, peer wireless stations and wireless stations may be referred to interchangeably as communications devices or apparatus.

Figures 3A, 3B:
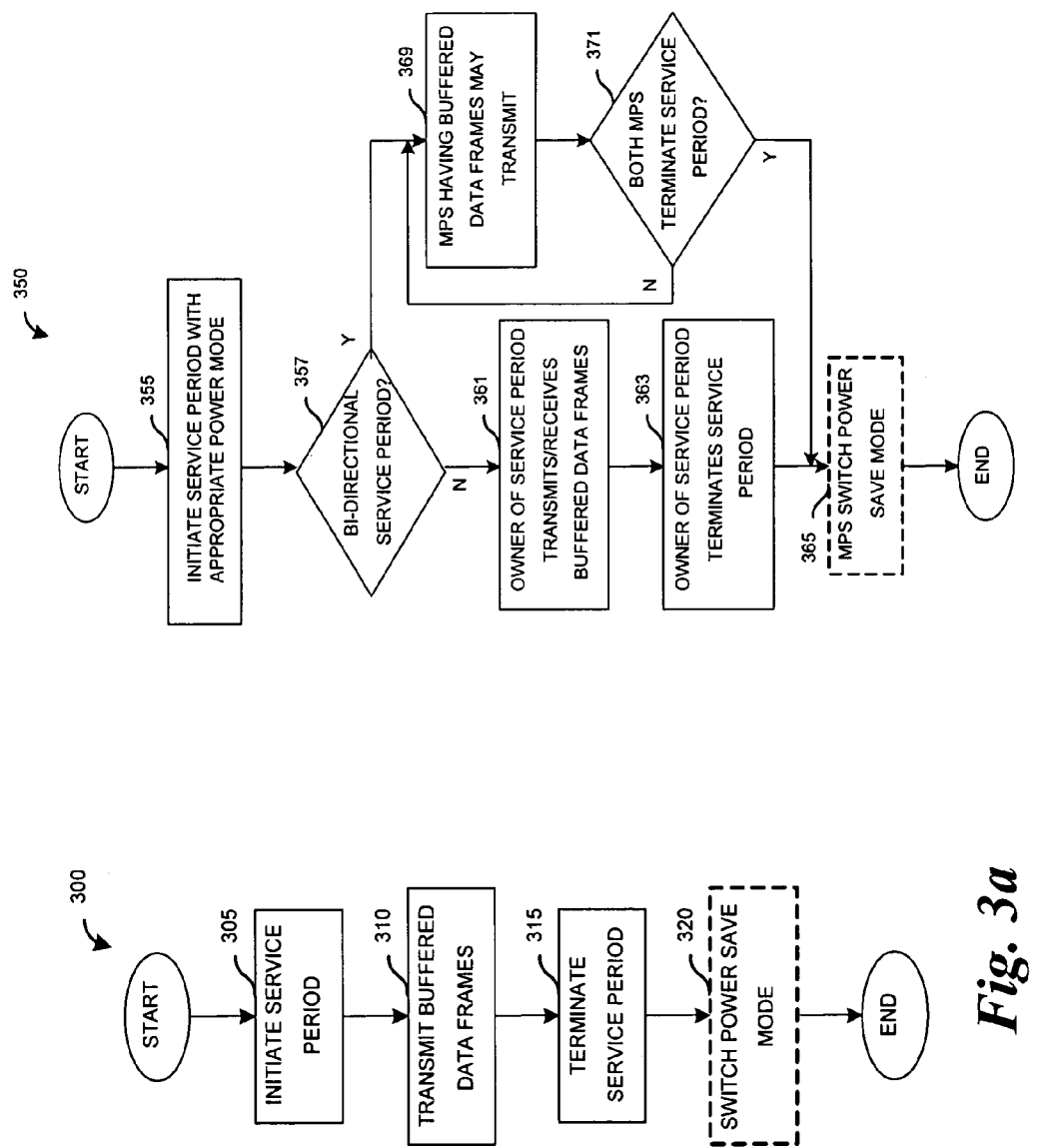
FIG. 3a illustrates a diagram of an embodiment of a sequence of events in the transmission of data frames between a first mesh point and a second mesh point in accordance with the principles of the present invention.
FIG. 3b illustrates a diagram of an embodiment of a sequence of events in the transmission of data frames between a first mesh point and a second mesh point in accordance with the principles of the present invention.

Turning now to FIG. 3a, illustrated is a diagram of an embodiment of a sequence of events 300 in the setup and use of a service period in accordance with the principles of the present invention. A service period may be a contiguous time period, during which two mesh points (which have created peer communications link) may be listening to communications media. A service period may have multiple initiation mechanisms as described previously. A step 305 illustrates the use of one such service period initiation mechanism to initiate a service period and a step 310 illustrates the use of the service period. During the service period, the mesh points may exchange data, control or management frames. A step 315 shows the termination of the service period. The service period may use a termination signaling, which ends the service period. The termination signaling may be different for uni-directional and bi-directional service periods. A step 320 shows an optional switching of a power save mode after the termination of the service period. For example, one or both of the mesh points may remain in a same power save mode that they were in during the service period (e.g., a power save supported-doze mode with receiver on) or one or both of the mesh points may switch to a power save supported-doze mode by setting or transitioning the receivers off.

Turning now to FIG. 3b, illustrated is a diagram of an embodiment of a sequence of events 350 in the use of a service period for data transmission between a first mesh point and a second mesh point in accordance with the principles of the present invention. The sequence of events 350 may provide greater detail of the transmission of data frames than the sequence of events 300 described with respect to FIG. 3a. The transmission of data frames may begin with an initiation of a service period at a step 355. Then, depending on the type of service period for a communications link at a step 357, either a bi-directional service period or one or two uni-directional service period may be initiated. The transmission of data frames within service period and the termination of the service period may operate slightly differently depending on the type of service period.

If a communications link uses a uni-directional service period, the service period may enable either mesh point to transmit data frames to another, with the mesh point able to transmit being dependent on an initiator of the service period. The service period may be initiated by any mechanism described herein, for instance, by transmitting an ATIM frame to indicate that the transmitter of the ATIM frame desires to send data frames, or receiving a PS-poll frame during an ATIM period to indicate that the transmitter of the PS-poll frame desires to poll buffered data frames, or by sending a trigger frame from a power save supported-doze mode mesh point to a power save supported-active mode mesh point. The buffered data frames (also referred to as buffered frames) delivery is ongoing at step 361. The transmitter of the data, control or management frames may terminate the service period at a step 363, by transmitting a frame with a more data bit set to zero (0), indicating that the buffered frames have been transmitted and, subsequently, receiving an acknowledgement to the frame. In an alternative embodiment for the termination of a service period, the transmitter of the data may transmit a frame with a set end of service period ("EOSP") bit and then receive an acknowledgement for the frame. The end of service period bit may indicate that the transmitter in the service period desires to terminate the service period. After service period termination, if the mesh points do not have any additional active service periods and, if the communications links are operating in power save supported-doze mode, the mesh points may remain in a power save supported-doze mode with its receiver on or the mesh point may enter a power save supported-doze mode with its receiver off at a step 365. Regardless of their respective receivers being on or off, the mesh points may be operating in a power save supported-doze mode.

A communications link may have two uni-directional service periods ongoing at the same time, if the two mesh points of the communications link transmit data frames to each other. If there are two uni-directional communications links operating at the same time for a single communications link, then the two service periods may be operating independently of each other. It should also be understood that it is possible to initiate two uni-directional service periods with a single trigger, to enable both mesh points to transmit data frames to each other. Additionally, a service period for one mesh point may be terminated, while the other mesh point continues to participate in another service period by, for instance, receiving data frames until the respective another service period is terminated.

If the communications link uses bi-directional service periods, both mesh points may transmit buffered management and data frames at a step 369. There may be several techniques for terminating a bi-directional service period. In a first embodiment of the termination of the bi-directional service period, either mesh point may transfer the last of the buffered data frames, the last buffered data frame having its more data bit set to zero (0) to signal that the mesh point has completed the transfer of its buffered data frames and wishes to terminate the service period. The other mesh point signals an acknowledgement to the frame with its more data bit set to zero (0) to terminate the service period at a step 371. If the acknowledgement frame does not contain the more data bit set to zero (0), the service period may continue with the transfer of any remaining buffered data frames at the step 369. If the service period termination is not successful, (e.g., both the transmitted data, management or null frame contained more data bit set to zero (0) and the acknowledgement contained more data bit set to zero (0)), the mesh points may repeat the service period termination signaling attempt, by transmitting new data, management, or null frame(s), and by receiving acknowledgement for the transmitted frame, both having more data bits set to zero (0). In another embodiment of the termination of the bi-directional service period, a transmitted frame may have its EOSP bit set to one (1). If the transmission is acknowledged with an acknowledgement containing an EOSP bit set to one (1), the service period may be terminated. A mesh point may transmit a data frame with its EOSP bit set to one (1), even if the mesh point still has buffered data. If the mesh points after the termination of the bi-directional service period does not have any ongoing service periods and if the communications links are operating in power save supported-doze mode, the mesh points may remain in a power save supported-doze mode with its receiver on or the mesh point may enter to a power save supported-doze mode with its receiver off at a step 365.

Figure 4D:
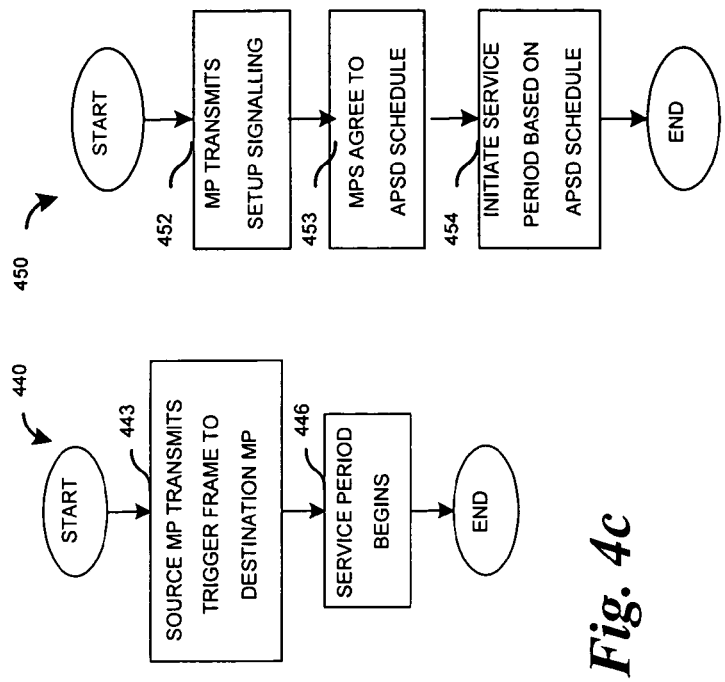
FIG. 4d illustrates a diagram of an embodiment of a sequence of events in data transfer with a mesh point in power save mode for real-time applications in accordance with the principles of the present invention.
Figure 4C:
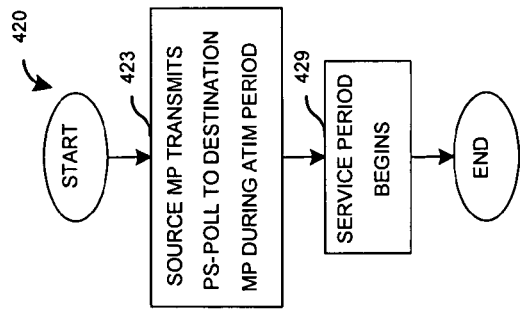
FIG. 4c illustrates a diagram of an embodiment of a sequence of events in the initiation of a service period using a trigger frame in accordance with the principles of the present invention.
Figure 4B:
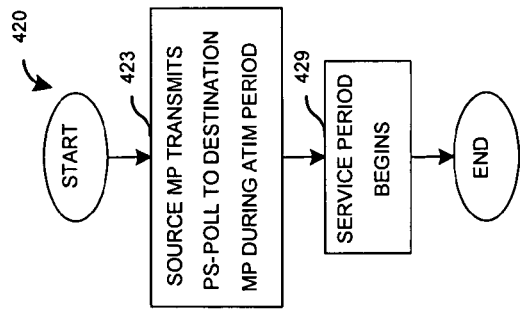
FIG. 4b illustrates a diagram of an embodiment of a sequence of events in the initiation of a service period using a power save poll transmitted during an ATIM period in accordance with the principles of the present invention.
Figure 4A:
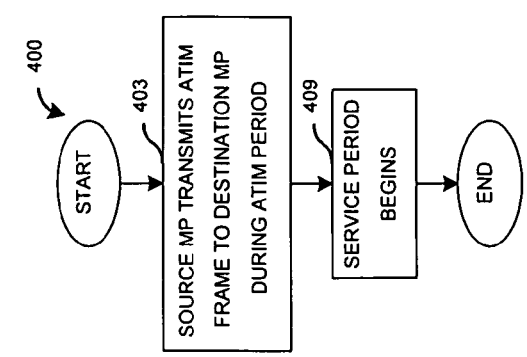
FIG. 4a illustrates a diagram of an embodiment of a sequence of events in the initiation of a service period using an announcement traffic indication message ("ATIM") transmission in accordance with the principles of the present invention.

Turning now to FIG. 4a, illustrated is a diagram of an embodiment of a sequence of events 400 in the initiation of a service period using an ATIM transmission in accordance with the principles of the present invention. The sequence of events 400 may be an implementation of the initiate service period step, step 305 of FIG. 3a. The initiation of the service period may begin with a source mesh point (e.g., either the first mesh point or the second mesh point) transmitting an ATIM frame during the ATIM period to the peer mesh point (e.g., either the first mesh point or the second mesh point) at a step 403. The receipt of the acknowledgement to the ATIM frame at the peer mesh point may start the service period at step 409. The service period may be terminated by a source or originating mesh point of the service period (e.g., in a uni-directional service period) or by both mesh points (e.g., in a bi-directional service period) as described previously.

Turning now to FIG. 4b, illustrated is a diagram of an embodiment of a sequence of events 420 in the initiation of a service period when acknowledgement to the PS-poll frame is received during an ATIM period in accordance with the principles of the present invention. The sequence of events 420 may be an implementation of the initiate service period step, step 305 of FIG. 3a. The initiation of the service period may begin with a source mesh point (e.g., either the first mesh point or the second mesh point) transmitting a PS-poll during the ATIM period to the peer mesh point (e.g., either the first mesh point or the second mesh point) at a step 423. The peer mesh point acknowledges the transmitted PS-poll frame and the acknowledgement is received at the source mesh point to start the service period at step 429. The service period may be terminated by the peer mesh point of the service period (e.g., in a uni-directional service period) or by both mesh points (e.g., in a bi-directional service period) as described previously.

Turning now to FIG. 4c, illustrated is a diagram of an embodiment of a sequence of events 440 in the initiation of a service period using a trigger frame in accordance with the principles of the present invention. The sequence of events 440 may be an implementation of the initiate service period step, step 305 of FIG. 3a. The initiation of the service period may begin with a source mesh point (e.g., either the first mesh point or the second mesh point) transmitting a trigger frame to a peer mesh point (e.g., either the first mesh point or the second mesh point) at a step 443. The source mesh point may be operating in power save supported-doze mode and the peer mesh point may be operating in power save supported-active mode. After the peer mesh point acknowledges the trigger frame, the service period may begin at a step 446. The service period created using the trigger frame may be a uni-directional or a bi-directional service period. When the service period is ongoing, the peer mesh point (e.g., the full power mesh point) may transmit buffered data frames destined for the source mesh point. The service period may be terminated by the peer mesh point of the service period (e.g., in a uni-directional service period) or by both mesh points (e.g., in a bi-directional service period) as described previously.

If both the source and destination mesh points operate in power save supported-doze mode, a trigger frame transmitted in step 443 may initiate two uni-directional service periods, one owned by the source mesh point and another by the destination mesh point. If bi-directional service periods are used, then one bi-directional service period is initiated.

Turning now to FIG. 4d, illustrated is a diagram of an embodiment of a sequence of events 450 in data transfer with a mesh point in power save supported-doze mode for real-time applications in accordance with the principles of the present invention. A second mechanism for supporting data transfer for real time applications using a periodic APSD transmission mode and may require service period setup signaling at a step 452. The service period setup signaling may be used to specify a periodicity of a periodic start time for the service periods. For example, the setup signaling may specify a start time for a first service period and then an interval between subsequent service periods. After the mesh points agree on the setup signaling at a step 453, the service periods may initiate at times specified by the setup signaling at a step 454.

Figures 4E, 4F:
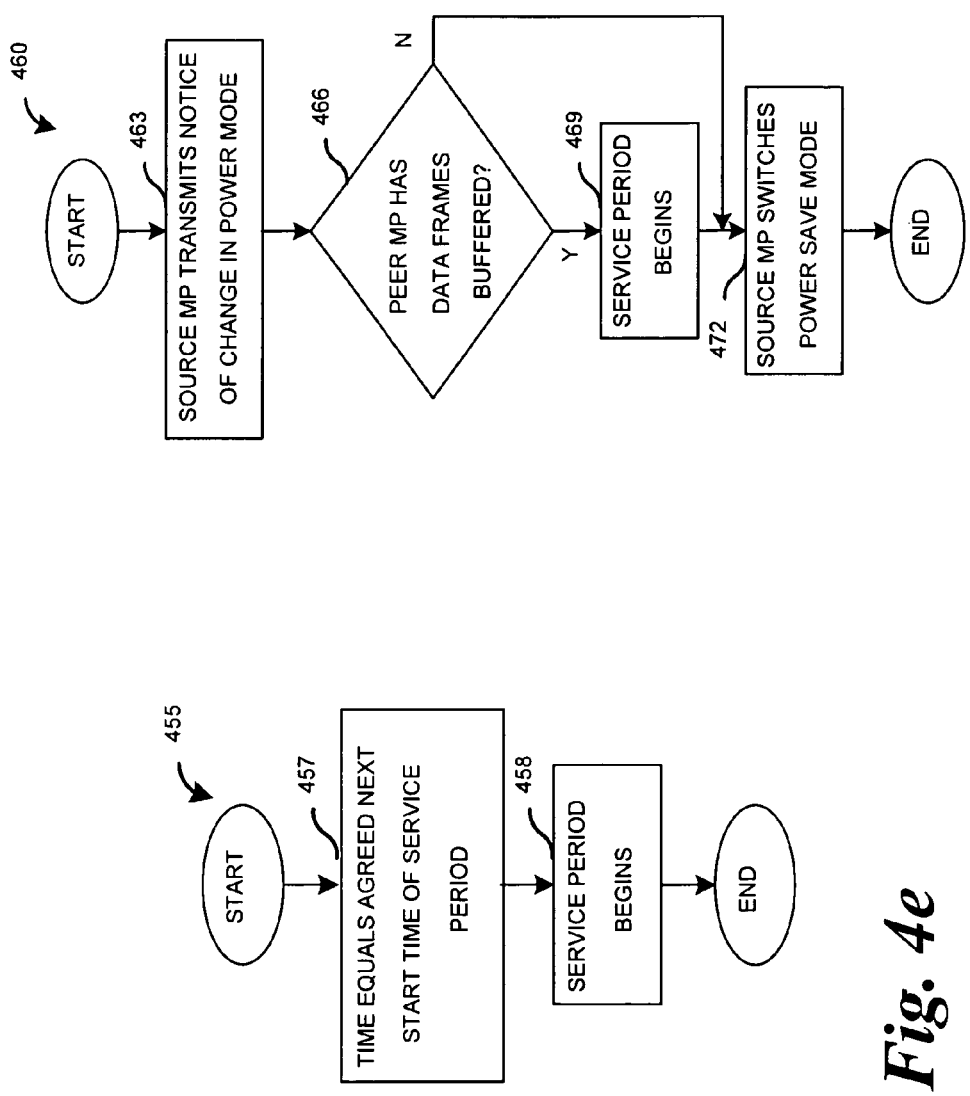
FIG. 4e illustrates a diagram of an embodiment of a sequence of events in the initiation of a service period using a periodic automatic power save delivery ("APSD") transmission mode in accordance with the principles of the present invention.
FIG. 4f illustrates a diagram of an embodiment of a sequence of events in the initiation of a service period using a power management mode transition in accordance with the principles of the present invention.

Turning now to FIG. 4e, illustrated is a diagram of an embodiment of a sequence of events 455 in the initiation of a service period using a periodic APSD transmission mode in accordance with the principles of the present invention. The sequence of events 455 may be an implementation of the initiate service period step, step 305 of FIG. 3a. The initiation of the service period may begin when a timer or a clock determines that a duration of time about equal to an agreed upon period of time has elapsed or that a current time is about equal to an agreed upon start time to start a service period at step 457. Once the agreed upon period of time has elapsed or the start time is reached, the service period may begin at step 458.

Turning now to FIG. 4f, illustrated is a diagram of an embodiment of a sequence of events 460 in the initiation of a bi-directional service period using a power save supported-active mode transition to a power save supported-doze mode in accordance with the principles of the present invention. In the sequence of events 460 it may be assumed that bi-directional service periods are used for the communication link. When a mesh point changes power management modes by using a unicast frame exchange, it may be possible that a service period will be initiated. When a mesh point, such as the source mesh point, wishes to change from power save supported-active mode to power save supported-doze mode, the source mesh point may transmit a unicast media access control ("MAC") protocol data unit ("MPDU") or a MAC management protocol data unit ("MMPDU") with power management bit set to zero (0) as a notice of power mode change to a peer mesh point at a step 463.

If the peer mesh point has buffered data frames for the source mesh point at a step 466 and the mesh points are using bi-directional service periods for the communications link, then an acknowledgement frame for notifying receipt of the MPDU or MMPDU by the peer mesh point may be transmitted by the peer mesh point including the more data bit set to one (1), which may initiate a service period at a step 469. The peer mesh point may transmit an acknowledgement back to the source mesh point regardless if the peer mesh point has buffered data frames or not, after the source mesh point transmits its notice of power management mode change at the step 463. However, the value of the more data bit may differ depending on a presence of buffered data frames. If the mesh points after the termination of the bi-directional service period does not have any ongoing service periods and if the communications links are operating in power save supported-doze mode, the mesh points may remain in a power save supported-doze mode with its receiver on or the mesh point may enter to a power save supported-doze mode with its receiver off at a step 472.

Turning now to FIG. 5a, illustrated is a transmission diagram displaying exemplary transmissions between a source mesh point and a peer mesh point wherein the source mesh point desires to change power management states and a bi-directional service period is used for the communications link in accordance with the principles of the present invention. In order to indicate a desire to change state, the source mesh point may transmit either a MPDU or a MMPDU with its power management ("PM") bit set to zero (0) and more data bit set to zero (0), indicating that the source mesh point may wish to change to power save supported-doze mode and it may have no more data to transmit (designated by transmission 505). Then, the peer mesh point may transmit an acknowledgement back to the source mesh point with its more data bit set to zero (0), indicating that the peer mesh point has no more data to transmit to the source mesh point (designated by transmission 510). After the source mesh point receives the transmission 510, if the mesh points after service period termination do not have any ongoing service periods and if the communications links are operating in power save supported-doze mode, the mesh points may remain in a power save supported-doze mode with its receiver on or the mesh point may enter to a power save supported-doze mode with its receiver off.

Turning now to FIG. 5b, illustrated is a transmission diagram displaying exemplary transmissions between a source mesh point and a peer mesh point wherein the source mesh point desires to change power management states for the communication link and a bi-directional service period is used for the communications link in accordance with the principles of the present invention. As in the diagram illustrated in FIG. 5a, the source mesh point may transmit either a MPDU or a MMPDU with PM bit set to zero (0) and the more data bit set to zero (0) to its peer mesh points (designated by transmission 505). However, the recipient may have buffered data frames for the source mesh point. Rather than transmitting an acknowledgement with its more data bit set to zero (0), which causes no service period triggering, the peer mesh point may transmit an acknowledgement with its more data bit set to one (1) (designated by transmission 520).

The transmission 520 may initiate a service period between the source mesh point and the peer mesh point. The peer mesh point may then transmit data frames to the source mesh point until, on the last data frame, the peer mesh point may set the more data bit to zero (0) to indicate that it has no more buffered data frames or buffered frames for the source mesh point (designated by transmission 525). Upon receipt of the last data frame with the more data bit set to zero (0), the source mesh point may send an acknowledgement back to the peer mesh point with its more data bit set to zero (0) (designated by transmission 530). When the peer mesh point receives the transmission 530, the service period ends between the mesh points.

Alternatively, an EOSP bit may be used to terminate the service period. A transmitted frame may have its EOSP bit set to one (1). If the transmission is acknowledged with an acknowledgement containing an EOSP bit that is also set to one (1), then the service period may be terminated (see FIG. 6c).

Turning now to FIG. 6a, illustrated is a transmission diagram displaying exemplary transmissions between a source mesh point and a peer mesh point to terminate a service period in accordance with the principles of the present invention. During a service period, either a unidirectional service period or a bi-directional service period, a source mesh point may transmit frames to a peer mesh point (and vice versa in a bi-directional service period). As the source mesh point transmits a last data frame to the peer mesh point, the source mesh point may set the last data frame's more data bit to zero (0) to indicate that it has no more buffered data frames for the peer mesh point (designated by transmission 605). The peer mesh point, after receiving the last data frame with the more data bit set to zero (0) may send back an acknowledgement to the source mesh point (designated by transmission 610). If the peer mesh point has no data frames to transmit to the source mesh point, then the acknowledgement may also have its more data bit set to zero (0). The transmission of the acknowledgement by the peer mesh point may mark the end of the service period for the peer mesh point and the receipt of the acknowledgement from the peer mesh point may mark the end of the service period for the source mesh point.

Figure 6C:
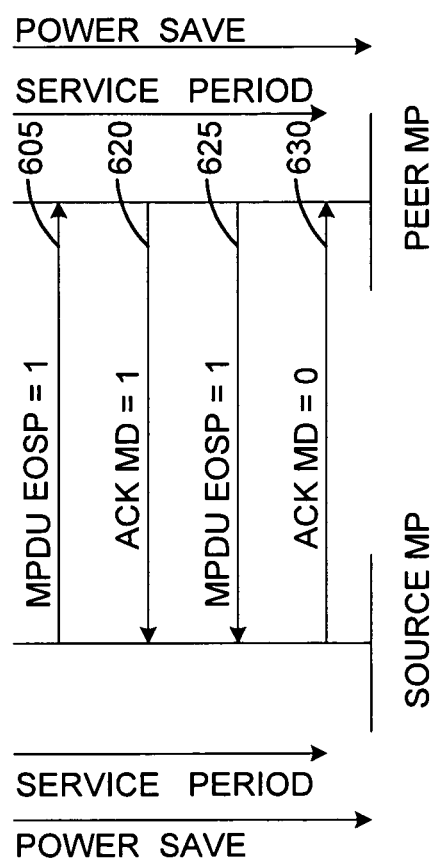

Turning now to FIGS. 6b and 6c, illustrated are transmission diagrams displaying exemplary transmissions between a source mesh point and a peer mesh point to end a service period in accordance with the principles of the present invention. Beginning with FIG. 6b, after the source mesh point transmits the last data frame to the peer mesh point with the more data bit set to zero (0) (designated by transmission 605), the peer mesh point may still have additional data frames to transmit to the source mesh point. If this is the case, then the peer mesh point may transmit an acknowledgement to the source mesh point with its more data bit set to one (1) (designated by transmission 620), indicating that the peer mesh point has additional data frames to transmit. The peer mesh point may then continue to transmit data frames to the source mesh point. Then, as the peer mesh point transmits a final data frame to the source mesh point, the peer mesh point may set the final data frame's more data bit to zero (0) (designated by transmission 625), indicating that the peer mesh point has no more data frames to transmit. The source mesh point may then transmit an acknowledgement back to the peer mesh point with its more data bit set to zero (0) (designated by transmission 630). The transmission of the acknowledgement by the source mesh point may mark the end of the service period for the source mesh point and the receipt of the acknowledgement from the source mesh point may mark the end of the service period for the peer mesh point.

Referring to FIG. 6c, the source mesh point may transmit a MPDU with EOSP bit set to one (1) and the peer mesh point transmits an acknowledgement with its more data bit set to one (1), and a MPDU with EOSP bit set to one (1). The source mesh point responds with an acknowledgement with its more data bit set to zero (0) to terminate the service period.

Turning now to FIG. 7a, illustrated is a transmission diagram displaying exemplary transmissions between a source mesh point and a peer mesh point to terminate a service period using EOSP bits in accordance with the principles of the present invention. During a service period, either a uni-directional service period or a bi-directional service period, a source mesh point may transmit data frames to a peer mesh point (and vice versa in a bi-directional service period). As the source mesh point transmits the last data frame to the peer mesh point, the source mesh point may set the last data frame's EOSP bit to one (1) to indicate that it wishes to terminate the service period (designated by transmission 705). The peer mesh point, after receiving the frame with the EOSP bit set to one (1) may send back an acknowledgement to the source mesh point (designated by transmission 710). If the peer mesh point also wishes to terminate the service period, then the acknowledgement may also have its EOSP bit set to one (1). The transmission of the acknowledgement by the peer mesh point may mark the end of the service period for the peer mesh point and the receipt of the acknowledgement from the peer mesh point may mark the end of the service period for the source mesh point.

Turning now to FIG. 7b, illustrated is a transmission diagram displaying exemplary transmissions between a source mesh point and a peer mesh point to end a service period with EOSP bits in accordance with the principles of the present invention. After the source mesh point transmits a frame to the peer mesh point with the EOSP bit set to one (1) (designated by transmission 705), the peer mesh point may still wish to continue the service period. If this is the case, then the peer mesh point may transmit an acknowledgement to the source mesh point with its EOSP bit set to zero (0) (designated by transmission 720), indicating that the peer mesh point still wishes to continue with the service period. The peer mesh point may then continue to transmit frames to the source mesh point. Then, as the peer mesh point transmits a frame to the source mesh point, the peer mesh point may set the frame's EOSP bit to one (1) (designated by transmission 725), indicating that the peer mesh point wishes to terminate the service period. The source mesh point may then transmit an acknowledgement back to the peer mesh point with its EOSP bit set to one (1) (designated by transmission 730). The transmission of the acknowledgement by the source mesh point may mark the end of the service period for the source mesh point and the receipt of the acknowledgement from the source mesh point may mark the end of the service period for the peer mesh point.

In a uni-directional service period, the peer mesh point may not be capable of setting its more data bit to acknowledgement frames according to its data buffer status for the peer mesh point. Furthermore, the more data bit value in acknowledgement frame may not have any effect on the continuation of the service period.

Figure 8:
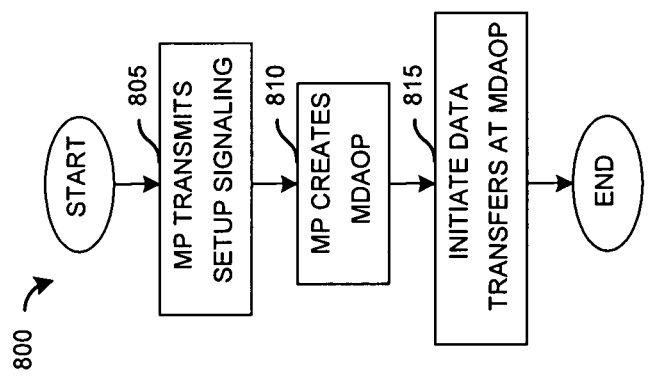
FIG. 8 illustrates a diagram of an embodiment of a sequence of events in initiating a data transfer opportunity using a reservation based mechanism in accordance with the principles of the present invention.

Turning now to FIG. 8, illustrated is a diagram of an embodiment of a sequence of events 800 in initiating a data transfer opportunity using a reservation based mechanism in accordance with the principles of the present invention. The reservation based mechanism makes use of mesh deterministic access ("MDA") and may require setup signaling at a step 805. The data transfer opportunity created by an MDA may differ from a service period in that all mesh points capable of MDAs may know of the data transfer opportunity while only the mesh points involved in a service period may be cognizant of the service period. The setup signaling may specify a transmitter and a receiver of the data transfer opportunity and a specific time period (duration) of the data transfer opportunity. The duration of the data transfer opportunity may be referred to as a MDA opportunity ("MDAOP") and may be informative in nature. Then, as the data transfer opportunity is created at the specified time and for the specified duration at a step 810, the data transfers may be initiated at a step 815. The data transfer opportunity may be terminated at or about the amount of time specified as the duration of the MDAOP using one of the mechanisms for terminating a service period described above. If a receiving mesh point in a MDAOP operates in a power save mode, a service period should be triggered at the time when the MDAOP begins.

A system and method for providing service periods for communication devices over a peer communication link has been illustrated and described. The service periods may be divided into three periods, namely, an initiation period, data transmission and a termination period. During the initiation period, a communications device may send a trigger frame to initiate the service period, which is operable if the communication devices do not have an ongoing service period and at least one of the communication devices is in a power save mode. For a unidirectional service period, if both communication devices operate in a power save mode, then two unidirectional service periods are initiated. If a first communications device operates in a power save mode and a second communications device operates in an active mode, the first communications device may initiate a uni-directional service period in accordance with a trigger frame or otherwise. If both communications devices are operating in an active mode, the service periods are typically not used. For bi-directional service periods (wherein both communications devices may transmit information), either communications device may initiate a service period as long as one of the communications devices is in a power save mode.

As mentioned above, a bi-directional service period is delineated by both communications devices being configured to transmit and receive frames to and from one another. During a uni-directional service period, only the transmitting communications devices may transmit frames. Under such circumstances, if the other communications device operates in an active mode, the other communications device may receive frames at any time.

Following the data transmission, the service period may be terminated, for instance, by providing a frame with an end of service period bit to indicate the end of the service period, which may be confirmed in the form of an acknowledgement. The bi-directional service period may be terminated with a transmission of a data frame plus an acknowledgement frame including confirmation for the termination. Both the transmission and reception capabilities of the communications device are terminated in the termination phase. A service period for a uni-directional service period may be terminated by the transmitting communication device providing a frame to the other communications device with an end of service period bit indicating that an end of the service period is desired, to which an acknowledgement confirms the termination of the service period. In another embodiment, a service period for two uni-directional service periods may be terminated by the transmitting communication device providing a frame to the other communications device with an end of service period bit indicating that an end of the service period is desired, to which an acknowledgement confirms the termination of the service period. The other communications device, however, acts according to its own service period and may terminate the service period on its own accord.

Thus, a system and method has been introduced for power saving transmission in wireless communications networks. In one embodiment, a communications device for the wireless communications network includes a transceiver configured to transmit and/or receive one or more frames over a communications link to and/or from another communications device. The communications device also includes a controller configured to initiate a unidirectional or bi-directional service periods over the communications link with the another communications device. The controller is further configured to terminate the service period when the last data frame addressed to either the communications device or the another communications device have been transmitted.

In an embodiment, the communications device is a first mesh point and the another communications device is a second mesh point in the wireless communications network. The controller of the communications device may include a service period unit under control of a power management unit configured to initiate and terminate the service period, a link unit configured to establish the communications link with the another communications device, and a frame creator configured to format the data frames according to the wireless communications network. The controller may be part of a baseband unit that further includes an encoder configured to apply an error correcting code to the frames to be transmitted, an interleaver configured to interleave the frames to be transmitted, and a filter configured to filter the frames to be transmitted to provide spectral shaping.

The controller may be configured to initiate the service period by creating an announcement traffic indication message frame to be transmitted to the another communications device. The controller may also be configured to initiate the service period by creating a power save poll to be transmitted to the another communications device. The controller may also be configured to initiate the service period by creating a trigger frame to be transmitted to the another communications device. The controller may still further be configured to initiate the service period by creating an intent to change a power save supported doze-mode to be transmitted to the another communications device and processing an acknowledgement therefrom including a control bit set to a specified value indicating that the another communications device has frames addressed to the communications device.

The controller may also be configured to terminate the service period by creating a last data frame to be transmitted to the another communications device with a control bit set to a specified value indicating that an end of the service period is desired and processing an acknowledgment from the another communications device with a control bit set to a specified value indicating that an end of the service period is confirmed. The controller may also be configured to operate the communications device in a power save supported-doze mode with a receiver of the transceiver of the communications device in an off state after terminating the service period.

Thus, an apparatus (e.g., a controller) includes a link unit configured to establish a communications link for frames between communications devices in a wireless communications network. The apparatus also includes a service period unit configured to initiate at least one service period for transmission of data frames between the communications devices, and terminate the service period following an acknowledgement to a transmission of a last data frame therein between the communications devices.

In another aspect, a method is provided to operate a communications device in a wireless communications network. The method includes initiating uni-directional or a bi-directional service periods over a communications link between a first mesh point and a second mesh point of the wireless communications network. The method also includes transmitting and/or receiving one or more frames over the communications link during the service period. The method also includes terminating the service period when the last data frame addressed to either the first mesh point or the second mesh point have been transmitted. The first mesh point may have multiple communications links to a plurality of mesh points having independent service periods.

The aforementioned act of initiating may include transmitting an announcement traffic indication message frame from the first mesh point to the second mesh point and starting the service period. The act of initiating may also include transmitting a power save poll from the first mesh point to the second mesh point and starting the service period. The act of initiating may also include transmitting a trigger frame from the first mesh point to the second mesh point and starting the service period. The act of initiating may still further include transmitting an intent to change a power save supported doze-mode from the first mesh point to the second mesh point, receiving at the first mesh point an acknowledgement from the second mesh point including a control bit set to a specified value, and starting the service period. The specified value may indicate that the second mesh point has frames addressed to the first mesh point. Additionally, one of the first and second mesh points may operate in a power save supported-doze mode.

The aforementioned act of transmitting may include transmitting frames with a control bit set to a first specified value and transmitting a last data frame with a control bit set to a second specified value indicating that there are no more frames. The act of terminating may occur when a last data frame is transmitted. The act of terminating may also include transmitting data frame from the first mesh point to the second mesh point with a control bit set to a specified value indicating that an end of the service period is desired, and receiving at the first mesh point an acknowledgment from the second mesh point with a control bit set to a specified value indicating that an end of the service period is confirmed. The act of terminating may also include transmitting a frame from the first mesh point to the second mesh point with a control bit set to a specified value indicating that an end of the service period is desired, receiving at the first mesh point an acknowledgement from the second mesh point with a control bit set to a specified value indicating to continue the service period, receiving at the first mesh point a last data frame from the second mesh point with a control bit set to a specified value indicating that an end of the service period is desired, and transmitting an acknowledgement from the first mesh point to the second mesh point with a control bit set to a specified value indicating that an end of the service period is confirmed.

Additionally, the first mesh point may be a source mesh point and the service period is a uni-directional service period. The act of terminating may include terminating the uni-directional service period when a last data frame from the source mesh point to the second mesh point includes a control bit set to a specified value indicating that there are no more data frames addressed to the second mesh point. Alternatively, the service period may be a bi-directional service period. The act of terminating may include terminating the bi-directional service period when a last data frame from the first mesh point to the second mesh point includes a control bit set to a specified value indicating that there are no more frames addressed to the second mesh point and the second mesh point provides an acknowledgement thereto, and a last data frame from the second mesh point to the first mesh point includes a control bit set to a specified value indicating that there are no more frames addressed to the first mesh point and the first mesh point provides an acknowledgement thereto. Additionally, method may include operating at least one of the first and second mesh points in a power save supported-doze mode after terminating the service period. Of course, the frames may be buffered at the respective mesh points or communication devices prior to transmitting the same.

In addition, program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM ("EROM"), a floppy diskette, a compact disk CD-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising, establishing a peer-to-peer bi-directional service period between a pair of peer-to-peer wireless communication devices neither of which is an access point, wherein the pair of peer-to-peer wireless communication devices comprise a first wireless communication device and a second wireless communication device communicating directly with each other in an ad hoc wireless communication network; receiving at the second wireless communication device a first end of service period indication from the first wireless communication device, said first end of service period indication being effective to indicate to the second wireless communication device that the first wireless communication device does not have data left to transmit during the bi-directional service period; keeping the bi-directional service period open for communication of data between the first wireless communication device and the second wireless communication device until a second end of service period indication is transmitted from the second wireless communication device to the first wireless communication device, the second end of service period indication being effective to indicate to the first wireless communication device that the second wireless communication device does not have data left to transmit during the bi-directional service period; and terminating the bi-directional service period in response to transmitting the second end of service period indication to the first wireless communication device so that the peer-to-peer bi-directional service period does not end and communication of data is kept open until a first end of service period indication is received by the second wireless communication device from the first wireless communication device and the second end of service period indication is transmitted from the second wireless communication device to the first wireless communication device.

2. A method according to claim 1, wherein at least one of the first wireless communication device and the second wireless communication device is in a power save supported-active mode during the bi-directional service period.

3. A method according to claim 1, wherein the bi-directional service period is initiated by either the first wireless communication device or the second wireless communication while in a power save supported-doze mode.

4. A method according to claim 1, wherein the second wireless communication device sends an acknowledgement back to the first wireless communication device indicating receipt of the first end of service period indication.

5. A method according to claim 4, wherein the acknowledgement sent by the second wireless communication device and received by the first wireless communication device includes the second end of service period indication terminating the bi-directional service period.

6. A method according to claim 1, wherein the second wireless communication device transmits data to the first wireless communication device after receiving the first end of service period indication and before transmitting the second end of service period indication.

7. A wireless communication device comprising,
a transmitter for establishing a peer-to-peer bi-directional service period between the wireless communication device and a second wireless communication device wherein the wireless communication device and the second wireless communication device are a pair of peer-to-peer wireless communication devices, neither of which is an access point, and communicate directly with each other in an ad hoc wireless communication network, and transmitting to the second wireless communication device a first end of service period indication, said first end of service period indication being effective to indicate to the second wireless communication device that the wireless communication device does not have data left to transmit during the bi-directional service period wherein the bi-directional service period is kept open for communication of data between the wireless communication device and the second wireless communication device until a second end of service period indication from the second wireless communication device is received by the wireless communication device; and a receiver for receiving from the second wireless communication device the second end of service period indication effective to indicate to the wireless communication device that the second wireless communication device does not have data left to transmit during the bi-directional service period and wherein the bi-directional service period is terminated when the second end of service period indication is received by the wireless communication device so that the peer-to-peer bi-directional service period does not end and communication of data is kept open until a first end of service period indication is transmitted to the second wireless communication device by the wireless communication device and the second end of service period indication is received from the second wireless communication device by the wireless communication device.

8. A wireless communication device according to claim 7, wherein at least one of the wireless communication device and the second wireless communication device is in a power save supported-active mode during the bi-directional service period.

9. A wireless communication device according to claim 7, wherein the bi-directional service period is initiated by either the wireless communication device while in a power save supported-doze mode.

10. A wireless communication device according to claim 7, wherein the second wireless communication device sends an acknowledgement back to the first wireless communication device indicating receipt of the first end of service period indication.

11. A wireless communication device according to claim 10, wherein the acknowledgement sent by the second wireless communication device and received by the first wireless communication device includes the second end of service period indication terminating the bi-directional service period.

12. A wireless communication device according to claim 7, wherein the second wireless communication device transmits data to the first wireless communication device after receiving the first end of service period indication and before transmitting the second end of service period indication.

13. A method comprising,
establishing a peer-to-peer bi-directional service period between a wireless communication device and a second wireless communication device, wherein the wireless communication device and the second wireless communication device are a pair of peer-to-peer wireless communication devices, neither of which is an access point, and communicate directly with each other in an ad hoc wireless communication network, and transmitting to the second wireless communication device a first end of service period indication, said first end of service period indication being effective to indicate to the second wireless communication device that the wireless communication device does not have data left to transmit during the bi-directional service period wherein the bi-directional service period is kept open for communication of data between the wireless communication device and the second wireless communication device until a second end of service period indication is received by the wireless communication device; and receiving from the second wireless communication device the second end of service period indication effective to indicate to the wireless communication device that the second wireless communication device does not have data left to transmit during the bi-directional service period and wherein the bi-directional service period is terminated when the second end of service period indication is received by the wireless communication device so that the peer-to-peer bi-directional service period does not end and communication of data is kept open until a first end of service period indication is transmitted to the second wireless communication device from the wireless communication device and the second end of service period indication is received by the wireless device from the second wireless communication device.

14. A method according to claim 13, wherein at least one of the wireless communication device and the second wireless communication device is in a power save supported-active mode during the bi-directional service period.

15. A method according to claim 13, wherein the bi-directional service period is initiated by the wireless communication device while in a power save supported-doze mode.

16. A method according to claim 13, wherein the second wireless communication device sends an acknowledgement back to the first wireless communication device indicating receipt of the first end of service period indication.

17. A method according to claim 16, wherein the acknowledgement sent by the second wireless communication device and received by the first wireless communication device includes the second end of service period indication terminating the bi-directional service period.

18. A method according to claim 13, wherein the second wireless communication device transmits data to the first wireless communication device after receiving the first end of service period indication and before transmitting the second end of service period indication.

* * * * *